UNITED STATES PATENT OFFICE.

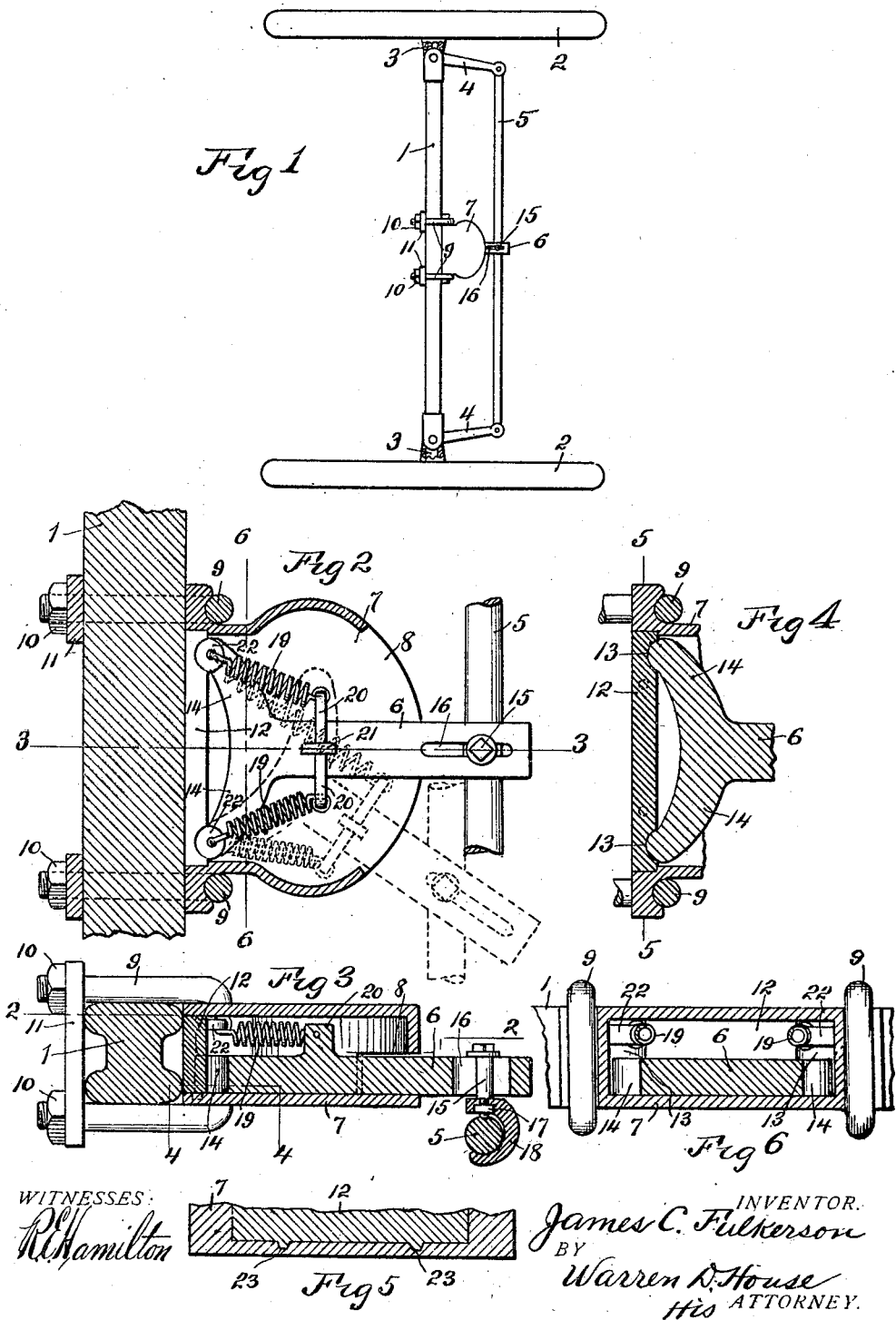

JAMES C. FULKERSON, OF KANSAS CITY, MISSOURI, ASSIGNOR, BY DIRECT AND MESNE ASSIGNMENTS, TO DONALD A. DAVIS, OF KANSAS CITY, MISSOURI.

STEERING DEVICE FOR AUTOMOBILES.

1,276,895. Specification of Letters Patent. Patented Aug. 27, 1918.

Application filed March 30, 1915. Serial No. 17,980.

*To all whom it may concern:*

Be it known that I, JAMES C. FULKERSON, a citizen of the United States, residing at Kansas City, in the county of Jackson and State of Missouri, have invented a certain new and useful Improvement in Steering Devices for Automobiles, of which the following is a specification.

My invention relates to improvements in steering devices for automobiles.

The object of my invention is to provide a simple, novel and efficient device for automatically forcing the steering rod of an automobile to and retaining it in the straight-ahead position. My improved device is adapted to be readily applied by an inexperienced person to automobiles now in common use.

The novel features of my invention are hereinafter fully described and claimed.

In the accompanying drawing, which illustrates the preferred embodiment of my invention, Figure 1 is a plan view of my improved device, shown attached to the steering rod and axle of an automobile.

Fig. 2 is a horizontal sectional view on the dotted line 2—2 of Fig. 3.

Fig. 3 is a vertical sectional view on the line 3—3 of Fig. 2.

Fig. 4 is a horizontal sectional view on the line 4—4 of Fig. 3.

Fig. 5 is a vertical sectional view on the line 5—5 of Fig. 4.

Fig. 6 is a vertical sectional view on the line 6—6 of Fig. 2.

Similar reference characters designate similar parts in the different views.

1 designates the front axle of an ordinary automobile.

2 designates the front automobile wheels mounted on the usual spindles 3 which are pivoted to the axle 1 and which are provided each with a rearwardly extending crank arm 4 to which are respectively pivotally connected the ends of the usual steering rod 5 which is adapted to be longitudinally oscillated by the ordinary steering mechanism not shown.

Pivotally and slidably connected to the steering rod 5 is a horizontal rearwardly extending lever 6 which is oscillatively mounted in a casing comprising a shell 7 which is provided at its rear end with a slot 8 through which the lever 6 extends.

The casing 7 is adapted to be clamped to the rear side of the axle 1 by means of two U-bolts 9 which embrace the upper and lower sides of the axle 1, the forward ends of the U-bolts being provided with nuts 10. Mounted upon said U-bolts respectively are two vertical plates 11 which bear against the forward side of the axle 1 to which they are clamped by the adjacent nuts 10. The forward end of the casing 7 is recessed and has fitted therein a plate 12, the forward side of which rests against the axle 1 and the rear side of which is provided with two arcuate recesses 13 which serve as seats respectively in which are fulcrumed two arms 14 with which the forward end of the lever 6 is provided.

When the lever 6 is in the straight-ahead position shown in Fig. 1 and in Fig. 4 and in solid lines in Fig. 2, said arms 14 both rest in the seats 13 as shown in Fig. 4. When the lever 6 is oscillated, the arms 14 rest alternately in said seats.

The lever 6 is preferably connected to the steering rod 5 by the following described mechanism.

A vertical bolt 15 is slidably and pivotally mounted in a longitudinal slot 16 with which the rearwardly projecting portion of the lever 6 is provided. The lower end of the bolt 15 is screw-threaded and has mounted thereon a nut 17 which is mounted in a recess provided therefor in the inner side and upper portion of a C-shaped member 18, which is adapted to embrace and clamp the steering rod 5, the latter being provided with a recess in its upper side in which rests the lower end of the bolt 15, between which and the member 18 the steering rod 5 is clamped, Fig. 3.

For normally forcing the lever 6 to the straight-ahead position shown in Fig. 2, and thereby bringing the steering rod 5 to the straight-ahead position, suitable yielding means may be provided comprising, preferably, two coiled springs, the rear ends of which are respectively secured to two laterally extending arms 20 with which the lever 6 is provided, or if desired, said springs may have their rear ends secured to a central lug 21 which extends upwardly from the upper side of the lever 6. The forward ends of the springs 19 are respectively secured to two rearwardly extending lugs 22, which are provided on the rear side of the plate 12, see Figs. 2, 3 and 6. The tension of the springs 19 and their location with respect to the lever 6 and lugs 22 are such that they tend to draw the lever to the medial or straight-ahead position shown in Fig. 2.

The lower edge of the plate 12, if desired, may be provided with one or more projections 23, Fig. 5, which are adapted to enter corresponding recesses provided in the bottom of the shell 7.

In the operation of my invention, when the steering rod 5 is oscillated by the steering mechanism not shown, the lever 6 is swung from the straight-ahead position shown in Figs. 1, 2 and 4, in solid lines, thereby swinging said lever from one of its fulcra to the other. When the operator releases the pressure which he has applied to the steering rod 5 through the steering mechanism, the spring 19, which is adjacent to the arm 14 which has been swung from its seat on fulcrum 13, draws the lever 6 back to the medial or straight-ahead position, thereby moving the steering rod 5 to the straight-ahead position, and thus swinging the spindles 3, through the intermediacy of their cranks 4 so as to bring the front wheels 2 into the straight-ahead position shown in Fig. 1.

I do not limit my invention to the structure shown and described, as modifications, within the scope of the appended claims, may be made without departing from the spirit of my invention.

What I claim is:—

1. In a steering device for automobiles, a lever support provided with means for attachment to the axle of an automobile, a lever having two fulcra on said support and, when in the straight-ahead position, resting upon both fulcra, and adapted when oscillated, to rest alternately upon said fulcra, means for clamping the steering rod of the automobile, pivotally and slidably connected with said lever, and yielding means for normally forcing said lever to the straight-ahead position.

2. In a steering device for automobiles, a lever support comprising a casing, means adapted to secure said casing to an automobile axle, a lever oscillatively mounted in said casing upon two fulcra and adapted when oscillated, to rest alternately upon said fulcra and in the straight-ahead position resting upon both fulcra, yielding means for normally forcing said lever to the straight-ahead position, and a device having means for being secured to the steering rod of the automobile and slidably and pivotally connected to said lever.

3. In a steering device for automobiles, a casing, means adapted to secure said casing to an automobile axle, a lever oscillatively mounted in said casing and having two fulcra upon which the lever, when oscillated, alternately rests, the lever in the straight ahead position resting upon both fulcra, the lever being provided with a longitudinal slot, a bolt slidable in said slot, means secured to said bolt and coöperating with said bolt for clamping a steering rod of the automobile, and yielding means for normally forcing said lever to the straight ahead position.

4. In a steering device for automobiles, a casing, means adapted to secure said casing to an automobile axle, a lever oscillatively mounted in said casing and having two fulcra upon which the lever, when oscillated, alternately rests, the lever in the straight ahead position resting upon both fulcra, the lever having a longitudinal slot, means slidable in said slot and adapted to clamp the steering rod of the automobile, and two springs connected to said lever and to said casing, one spring resisting swinging of the lever in one direction, and the other spring resisting swinging of the lever in the other direction.

5. In a steering device for automobiles, a lever support having means for being secured to an automobile axle, a lever oscillatively mounted on said support and having a slot, the lever having two fulcra on said support and, when in the straight ahead position resting upon both fulcra, and, when oscillated, resting alternately upon said fulcra, means adapted to be secured to the steering rod of an automobile and slidable in said slot and adapted to swing said lever, and means for normally swinging said lever to the straight ahead position.

6. In a steering device for automobiles, a lever support having means for being secured to an automobile axle, a lever oscillatively mounted on said support and having a slot, the lever having two fulcra on said support, and, when in the straight ahead position resting upon both fulcra, and, when oscillated, resting alternately upon said fulcra, means including a bolt slidable in said slot for clamping the steering rod of the automobile and adapted to swing said lever, and means for normally swinging said lever to the straight ahead position.

In testimony whereof I have signed my name to this specification in presence of two subscribing witnesses.

JAMES C. FULKERSON.

Witnesses:
WARREN D. HOUSE,
E. B. HOUSE.